(No Model.) 2 Sheets—Sheet 1.

E. W. STRANGE.
SET WORKS FOR SAW MILLS.

No. 290,137. Patented Dec. 11, 1883.

Witnesses:
Chas. S. Gooding.
Eugene H. Humphrey

Inventor:
Elias W. Strange
per Porter & Hutchinson
Attys (No Model.) 2 Sheets—Sheet 2.

E. W. STRANGE.
SET WORKS FOR SAW MILLS.

No. 290,137. Patented Dec. 11, 1883.

Witnesses:
Chas. S. Gooding.
Eugene Humphrey

Inventor:
Elias W. Strange
per Porter & Hutchinson Attys.

UNITED STATES PATENT OFFICE.

ELIAS W. STRANGE, OF TAUNTON, MASSACHUSETTS, ASSIGNOR TO THE STRANGE CYLINDER SAW AND MACHINE COMPANY, OF SAME PLACE.

SET-WORKS FOR SAW-MILLS.

SPECIFICATION forming part of Letters Patent No. 290,137, dated December 11, 1883.

Application filed March 29, 1883. (No model.)

*To all whom it may concern:*

Be it known that I, ELIAS W. STRANGE, of Taunton, in the county of Bristol and State of Massachusetts, have invented a new and useful Improvement in Set-Works for Saw-Mills, which will, in connection with the accompanying drawings, be hereinafter fully described, and specifically defined in the appended claims.

This invention has for its object the automatic, intermittent, and accurate movement of the log and its supporting-carriage toward the saw by the act of running back the carriage and log after each cut of the saw through the log, in order to set the log toward the saw the distance necessary to produce the required thickness of board.

Figure 1:
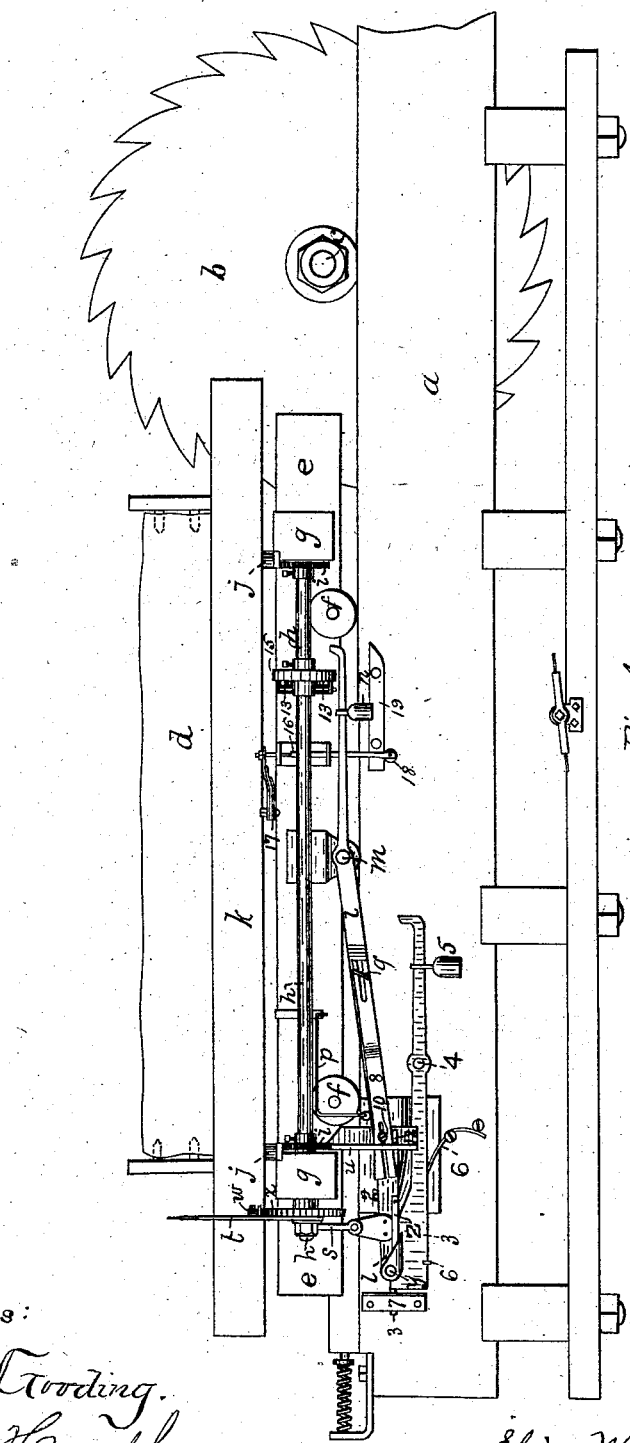
Figure 5:
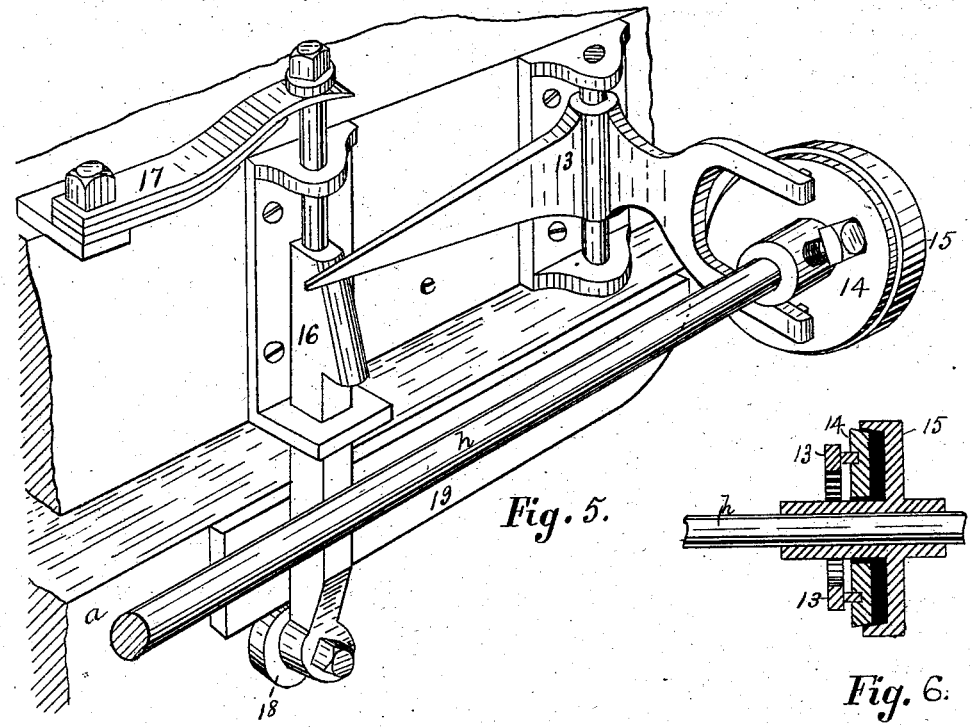
Figure 6:
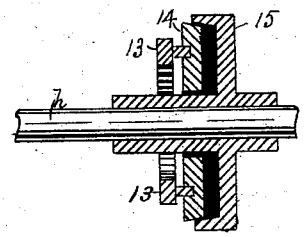
Figure 2:
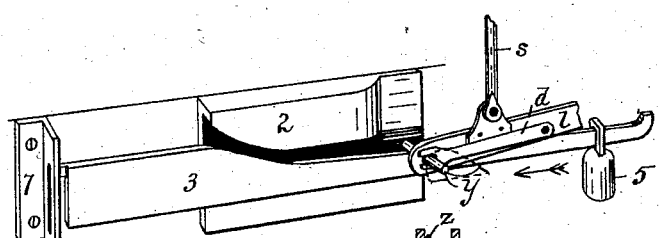
Figure 7:
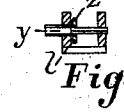
Figure 4:
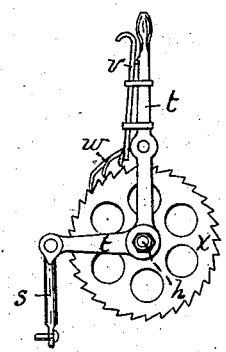
Figure 3:
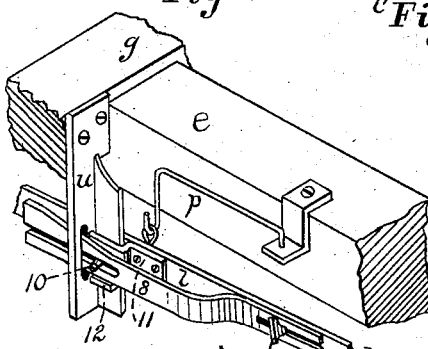

In said drawings, Figure 1 is a side elevation of a rotary saw-mill embodying my invention, the carriage being shown in the return position, and as ready to move the log past the saw. Fig. 2 is a detached perspective view, showing the setting-cam, its coacting-bar, and a portion of the traveling set-works. Fig. 3 is a view similar to Fig. 2, showing the adjusting-gage in connection with other parts. Fig. 4 is a detached elevation of the ratchet-and-pawl mechanism, taken as viewed from the left in Fig. 1. Fig. 5 is a perspective view, showing, detached, the clutch-binder and its actuating devices. Fig. 6 is a longitudinal vertical section, taken through the clutch, which is shown in Fig. 5. Fig. 7 is a transverse vertical section taken through the cam-pin carrier, and showing the pin in elevation, as will be explained.

In said views, $a$ represents the bed of the machine, which is of usual construction. $b$ is the saw, mounted on arbor $c$, and $d$ represents the log on the traveling carriage, in position to be fed past the saw, and subdivided thereby. Said carriage is formed with the usual lower frame, $e$, arranged to move back and forth past saw $b$ on rollers $f$, and provided with transverse bars $g$, in which is journaled the shaft $h$, on which are secured the small gears $i$ $i$, which, being respectively arranged thereon close to the inner vertical faces of transverse bars $g$, secure said shaft from lineal displacement therein. Said gears respectively mesh into racks $j$ $j$, which are secured to head-stock $k$, to which the log-dogging devices are secured, and which is, with the log, moved laterally in relation to the saw and bed by said racks as the log is "set" at the return movement of the carriage, as will be described, all which parts are old and well known, my invention relating more especially to the devices next to be described, by which shaft $h$ is automatically rotated to feed the log to the saw, and such rotation is varied in extent and regulated, and by which said shaft is locked and held from rotation while the log passes the saw.

For rotating shaft $h$, I pivot a bar, $l$, at $m$, to a bracket secured to carriage $e$. Said bar may extend to the right of said pivot and be adjustably counterweighted, as at $n$, or it may be provided with a cushioning-spring, $p$, Figs. 1, 3, or both, as desired. At the left-hand or rear end of said bar $l$ it is formed, as shown in Fig. 7, to receive and carry a pin, $y$, which slides freely therein, but is constantly pressed toward carriage $e$ by a spring, $z$, secured upon said bar, and which exerts its force against a shoulder of said pin, as shown in said Fig. 7. Said bar $l$ is connected by link or rod $s$ with angle-lever $t$, which is loosely mounted on shaft $h$, and which carries the pawl-bar $v$, in the lower end of which are pivotally arranged the multiple pawls $w$, which engage ratchet $x$, which is rigidly secured on shaft $h$, whereby, when bar $l$ is raised, it moves said pawls backward, and when it is depressed, in the manner to be described, pawls $w$ will be moved forward to the extent that they were moved backward, and so will rotate shaft $h$, and thereby, through gears $i$ and racks $j$, move log $d$ toward saw $b$. Said pawl carrier or bar $v$ is arranged in the usual manner to be moved up or down on the arm of lever $t$ to engage or disengage pawls $w$ with or from ratchet $x$, as the log is to be set to the saw, or the head-stock is to be withdrawn to receive a new log.

To so move bar $l$ vertically, I secure to bed $a$ the cam 2, whose lower and front faces are formed with irregular convex lines, as shown in Fig. 2, and a cam-bar, 3, pivoted to bed $a$ at 4 is, at its upper line, curved to correspond with the lower line or face of cam 2, and is so arranged as to leave a groove or space between the two. Said lever is provided with a counter-weight, 5, and a cushioning-spring, 6, while a projection formed upon its rear end, as shown in Fig. 2, moves in a slot in bracket 7 to give it steadiness of motion when it is moved up and down. When carriage e is run back after sawing a board, pin y in lever l habitually enters the groove or space between cam 2 and lever 3, as shown in Fig. 2, and as the resistance of the weight 5 or spring 6, or both, which sustain said bar 3, is greater than the weight of bar l, (which is in part supported by counter-weight n or spring p, or both, as described,) therefore pin y will traverse said groove, thereby raising bar l, (see Fig. 1,) and so actuating angle-lever t, to whose horizontal arm it is secured by link s, and carrying back pawls w to the proportionate extent; and when the carriage starts forward, said pin y encounters the lower face of cam 2, which thereby depresses bar l, thus rocking the vertical arm of lever t forward, and the pawls w thereby carried, acting on ratchet x, rotate shaft h, and thus set the log toward the saw, as already described.

To regulate the extent of set to be given to the log toward the saw, I arrange a gage-bar, 8, which at its right-hand end is slotted to receive and move on a set-screw, 9, which is threaded in bar l, and so serves for locking said bar 8. At the opposite or left-hand end this bar is slotted parallel with its lower edge, and its upper edge is oblique to the lower edge, as shown in Figs. 1, 3, and said bar moves lineally, when being adjusted in a vertical slot in bracket u, secured to a transverse bar, g, while a pin, 10, secured in a plate, 11, carried by bar l, enters the slot in gage-bar, 8, and so holds the same from vertical displacement relatively to bar l, and a projecting lip, 12, of said bracket 11 serves as a support for bar 8 and to prevent wear of pin 10.

It will be apparent that by graduating the obliquity of the upper line of gage-bar 8 and the length of the slot in bracket u, as well as the scope of lineal adjustment of said bar by means of its set-screw 9, the amount of vertical motion thereof can be so regulated or adjusted, and as bar l moves vertically therewith, therefore the amount of vertical motion of pin y, carried in the rear end of the bar, can be adjusted accordingly, and hence when said pin traverses the groove between cam 2 and bar 3 it will follow the same, unless the incline of bar 8 arrests its upward movement before it arrives at the rear end of the cam, in which event bar 3 will then be depressed to make way for said pin during the balance of its rearward movement, and as the extent of rise of bar l, when so moving rearward, controls the extent of the backward movement of pawls w, and as such backward movement of the pawls is always equal to the forward movement which is imparted to them through bar l, when the latter is depressed by the cam, therefore the lineal position of gage-bar 8 determines the amount of set of the log toward the saw.

For the purpose of locking shaft h when the log is engaged by the saw, and releasing the shaft when the carriage returns, I pivot an angle-arm, 13, in a bracket on carriage e, Fig. 5, the forked arm of which engages and holds from rotation the clutch-plate 14, which is seated in clutch 15, rigidly secured on the shaft. The opposite end of said lever is in contact with a vertically-moving incline, 16, which, when not otherwise controlled, is raised by spring 17, thereby forcing the adjacent arm of lever 13 outward, which causes the forked arm to force plate 14 into contact with clutch 15, thereby locking the shaft. When the carriage runs back, a roll, 18, pivoted in the lower end of incline 16 engages the lower edge of of cam 19, and thereby depresses said incline, thus releasing the clutch and allowing the set-works to be actuated as described. Cam 19 is of such length that incline 16 is released and locks the shaft as soon as the described set-works have moved the log to the saw.

If from any cause bar l should be raised when the carriage is moving backward after the sawing of a board, pin, y, in the rear end of said bar will, by its yielding action permitted by spring z, be moved outward when it encounters the convex line of the outer face of cam 2, and will pass along said face until it intersects or encounters the groove or space between said cam and bar 3, or until it reaches the rear end of the cam, according to the height of the bar, when it will, by the return action of said spring, be forced inward, so as to encounter the cam on the forward movement of the carriage, and so set the log toward the saw through the ratchet mechanism, as already described.

I claim as my invention—

1. In saw-mill set-works, the combination of the longitudinal shaft journaled in the lower traveling carriage and having secured thereon the pinions or small gears, which enmesh with and serve as the means of actuating the racks of the transversely-moving carriage, the clutch rigidly mounted upon said shaft and formed with a concentric rim having an interior converging diameter, the disk loosely mounted on said shaft and adapted to enter and frictionally engage the interior of said clutch, an angle-lever pivotally mounted at or near the vertex of its respective arms and formed with bifurcations at one extremity to engage, actuate, and hold said disk non-rotative, an incline or wedge arranged transversely to the opposite end of said lever and to actuate the same, and thereby force said disk into contact with said clutch, a spring arranged to lineally actuate said wedge and through the same the said disk, and an incline or cam arranged to engage a roll pivoted in the lower extremity of said lever-actuating incline, to depress and disengage the same from said angle-lever, all substantially as delineated in the accompanying drawings, and described in the foregoing specification.

2. In saw-mill set-works, the combination of the longitudinal shaft journaled in the lower traveling carriage, with the pinions or small gears thereon, secured and arranged to enmesh with and actuate the racks of the upper transversely-moving carriage, a ratchet-wheel secured on said shaft, an angle-lever loosely mounted on said shaft adjacent to said ratchet and carrying the multiple pawls arranged to engage, actuate, and be thrown out of contact with said ratchet, a vertically-vibrating bar connected with the horizontal arm of said angle-lever by a link or stirrup, and at one extremity pivotally connected with said lower traveling carriage, and at its opposite extremity arranged to be elevated and depressed by a cam mechanism, substantially as delineated in the accompanying drawings, and as described in the foregoing specification.

3. In saw-mill set-works, the combination of the shaft journaled in and arranged parallel with the lower longitudinally-moving bed, the gears secured on said shaft, the transversely-moving carriage and its racks enmeshing with said gears, a ratchet rigidly secured on said shaft, an angle-lever mounted loosely on said shaft and carrying multiple-pawls arranged to engage and rotate said ratchet, a cam fixed in position, and a bar pivoted at one end to said longitudinally-moving carriage and connected near its other end with the horizontal arm of said angle-lever by a link or stirrup, and at said last-named end constructed and arranged to engage said cam and to be thereby alternately raised and lowered, whereby it will rock said angle-lever, and through the pawls thereon mounted will rotate said shaft, and through its gears and said racks will move the upper carriage transversely to said shaft and toward the saw, substantially as delineated in the accompanying drawings, and described in the foregoing specification.

4. In saw-mill set-works, the combination, with a shaft journaled in the longitudinally-traveling bed, its gears, and the coacting racks of the transversely-moving bed, a ratchet rigidly mounted on said shaft, and an angle-lever loosely mounted on the shaft and carrying multiple pawls arranged to engage said ratchet and actuate the same, a cam fixed in position, a bar pivoted at one end and arranged to be vertically vibrated at the other and pivotally connected with the horizontal arm of said angle-lever, of a horizontal pin loosely mounted in the vertically-vibrating end of said bar, and provided with a spring arranged to habitually move said pin into contact with said cam, but admitting a lineal movement of the pin from said cam when superior force is exerted upon it, substantially as delineated in the accompanying drawings, and set out in the foregoing specification.

5. In saw-mill set-works, the combination, with the pawl-and-ratchet devices, the gears and racks thereby actuated and arranged to actuate the transversely-moving bed, the pivoted bar lineally reciprocating with the traveling bed, and connected with and arranged to actuate the angle-lever that carries said pawls, of a cam arranged in the path of said bar and adapted to elevate the same upon the return or rearward movement of the longitudinally-moving bed and to depress the end of said bar as said bed moves toward the saw, whereby the log is fed toward the saw through the action of the pawl-and-ratchet devices and the gears and racks, substantially as delineated in the accompanying drawings, and described in the foregoing specification.

6. In saw-mill set-works, the combination, with pawl-and-ratchet devices adapted and arranged to set the log and its transversely-moving bed toward the saw, through the action of racks and enmeshing gears, and a pivoted bar lineally reciprocated and connected with and arranged to actuate the pawl-carrying lever, and also provided with a lineally-moving cam-engaging spring-returned pin, of a cam arranged in the path of said pin, to engage the same, and thereby alternately elevate and depress said pivotal bar, and formed with a curved groove in its vertical face, to receive and guide said pin in its upward return movement and its descending forward movement, and also formed with a curved outward face, to lineally move said pin outward to insure its engagement in said groove when the pin encounters the same in its return movement, when by vertical displacement of said pin-carrying bar the pin does not at first enter said slot, substantially as described in the foregoing specification.

7. In saw-mill set-works, and in combination with the pivotal lineally-reciprocating cam-engaging bar, the pawl-and-ratchet mechanism actuated by said bar, and the geared devices actuated by said pawl-and-ratchet devices, and arranged to advance the transversely-moving carriage, of a cam combined and arranged to be encountered by and to elevate and depress the end of said reciprocating bar, and formed with a lower curved face and a pivotal yielding bar, constructed, combined, and arranged to constitute the lower face of a groove to receive, guide, and deflect the pin carried in said bar, substantially as delineated in the accompanying drawings, and set out in the foregoing specification.

8. In saw-mill set-works, the combination, with the pivoted vibrating bar, its actuating cam, the ratchet-and-pawl mechanism, and the gears and racks thereby actuated, of the gage-bar formed with an incline and arranged to be lineally adjusted and locked, and arranged in a governing-slot, whereby the rising motion of the vibrating cam-engaging bar is governed and controlled, and the consequent vibration of the pawls and rotation of the coacting ratchet is regulated to produce the desired set of the log toward the saw and consequent thickness of board, substantially as delineated in the accompanying drawings, and described in the foregoing specification.

ELIAS W. STRANGE.

Witnesses:
T. W. PORTER,
EUGENE HUMPHREY.